US010757054B1

(12) United States Patent
Paul (10) Patent No.: US 10,757,054 B1
(45) Date of Patent: Aug. 25, 2020

(54) SYSTEMS AND METHODS FOR DIGITAL PRIVACY CONTROLS

(71) Applicant: Facebook, Inc., Menlo Park, CA (US)

(72) Inventor: Debashish Paul, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/425,907

(22) Filed: May 29, 2019

(51) Int. Cl.
*G06F 15/16* (2006.01)
*H04L 12/58* (2006.01)
*G06F 15/173* (2006.01)

(52) U.S. Cl.
CPC .............. *H04L 51/14* (2013.01); *H04L 51/32* (2013.01)

(58) Field of Classification Search
CPC ................................ H04L 51/14; H04L 51/32
USPC .................................................. 709/207, 206
See application file for complete search history.

(56) References Cited

U.S. PATENT DOCUMENTS

| | | | |
|---|---|---|---|
| 8,147,251 B1 | 4/2012 | Anson | |
| 10,348,658 B2 | 7/2019 | Rodriguez et al. | |
| 10,623,831 B1 | 4/2020 | Paul | |
| 2012/0209815 A1 | 8/2012 | Carson et al. | |
| 2015/0220774 A1 | 8/2015 | Ebersman et al. | |
| 2016/0155063 A1 | 6/2016 | Rich | |
| 2016/0314120 A1 | 10/2016 | Dauderman et al. | |
| 2017/0185581 A1 | 6/2017 | Bojja et al. | |
| 2017/0250931 A1 | 8/2017 | Ioannou et al. | |
| 2017/0308290 A1 | 10/2017 | Patel | |
| 2017/0336928 A1 | 11/2017 | Chaudhri et al. | |
| 2018/0039406 A1 | 2/2018 | Kong et al. | |
| 2018/0173692 A1 | 6/2018 | Greenberg et al. | |
| 2018/0210874 A1 | 7/2018 | Fuxman et al. | |

OTHER PUBLICATIONS

Notice of Allowance received for U.S. Appl. No. 16/425,908 dated Jan. 15, 2020, 22 pages.
Paul, Debashish, "Macro-Navigation within a Digital Story Framework", U.S. Appl. No. 16/416,312, filed May 20, 2019, 51 pages.
Paul, Debashish, "Interactive Digital Time Display", U.S. Appl. No. 16/416,313, filed May 20, 2019, 46 pages.
Paul, Debashish, "Archive Full-Story Mode", U.S. Appl. No. 29/693,993, filed Jun. 6, 2019, 11 pages.
Paul, Debashish, "Archive Calendar Interface", U.S. Appl. No. 29/693,991, filed Jun. 6, 2019, 11 pages.
Paul, Debashish, "Archive Montage Interface", U.S. Appl. No. 29/693,989, filed Jun. 6, 2019, 11 pages.
Paul, Debashish, "Automated Social Media Replies", U.S. Appl. No. 16/425,909, filed May 29, 2019, 46 pages.

(Continued)

*Primary Examiner* — Karen C Tang
(74) *Attorney, Agent, or Firm* — FisherBroyles, LLP (57) ABSTRACT

Systems and methods for creating and maintaining digital privacy controls may include (1) providing a composition-creation interface that enables a user to create a social media composition, (2) additionally providing a privacy-settings interface that enables the user to select an audience for the social media composition, (3) displaying, within the privacy-settings interface, a slider element that may be used to select a size of the audience, where sliding the slider element in a first direction decreases a size of the audience and sliding the slider element in a second direction increases the size of the audience, and (4) configuring the size of the audience based on a position of the slider element. Various other methods, systems, and computer-readable media are also disclosed.

20 Claims, 6 Drawing Sheets

(56) References Cited

OTHER PUBLICATIONS

Non-Final Office Action received for U.S. Appl. No. 16/425,909 dated May 11, 2020, 28 pages.
Paul, Debashish, "Systems and Methods for Digital Privacy Controls", U.S. Appl. No. 15/931,145, filed May 13, 2020, 49 pages.

SYSTEMS AND METHODS FOR DIGITAL PRIVACY CONTROLS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Social media applications allow users to connect socially online. Some such applications may allow a user to create digital compositions to share with others. The digital compositions may include information chronicling the user's activities, thoughts, and/or opinions. Naturally, most users are concerned with data privacy and wish to control the audience with which they are sharing their compositions. At times, a user may prefer a post to be viewable by all of his or her digital contacts (i.e., a general audience). At other times, a user may prefer a post to only be viewable by a subset of his or her digital contacts (i.e., a preferred audience).

The present disclosure provides an elegant solution to data privacy that allows users to (1) select a reach for their story (i.e., a quantity component of a privacy selection process) and (2) select groups of friends with common attributes (i.e., "tribes") with whom to share the story (i.e., a quality component of the privacy selection process). In some examples, a story composition interface may include a slider element that may be used to select a story's reach by selecting a size of the story's audience. By sliding the element in one direction, the size of audience may decrease and by sliding the element in the other direction the size of audience may increase. The story composition interface may also include a variety of selectable elements that may be used to limit the story's audience to users within certain select groups. Each of the selectable elements may correspond to a group of friends with a shared attribute (e.g., live in India, went to Georgia Tech, etc.). Thus, members of a particular group may be added or removed from the audience by selecting or deselecting the particular group's corresponding selectable element (e.g., via a screen tap).

By allowing users to select a size of their audience and to select groups to include in the audience, the disclosed systems and methods may provide users with efficient control that does not require users to painstakingly include or exclude each of his or her contacts individually. This may improve the functioning of a computer itself by improving the computer's ability to meaningfully organize privacy-relevant data and efficiently receive user privacy selection inputs.

Figure 1:
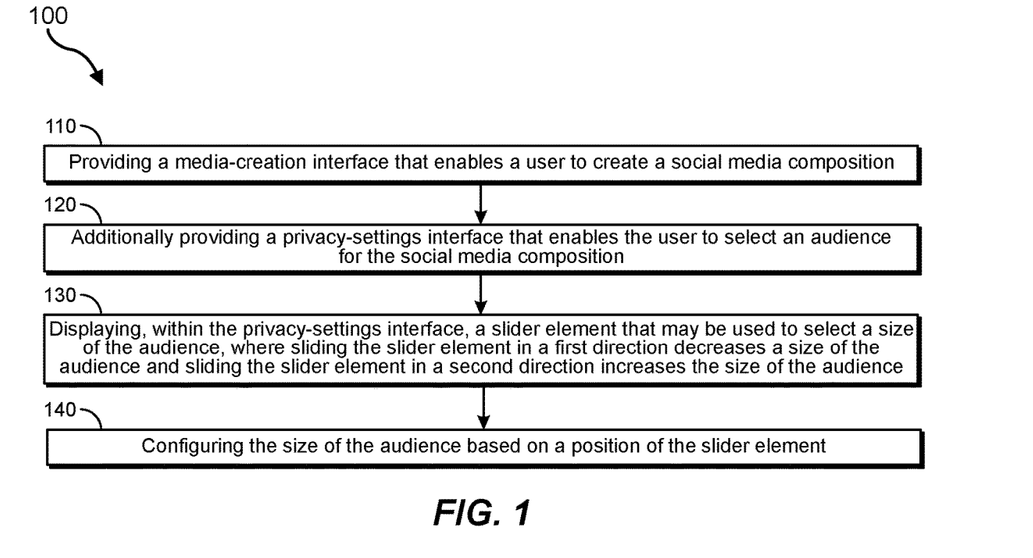
FIG. 1 is a flow diagram of an exemplary method for creating and maintaining digital elements for audience selection.

The following will provide, with reference to FIG. 1, detailed descriptions of computer-implemented methods for creating and maintaining digital privacy control elements for audience selection within a privacy-settings interface. Detailed descriptions of corresponding example systems will also be provided in connection with FIG. 2. Detailed description of a corresponding exemplary composition interface will be provided in connection to FIG. 3. Detailed description of a corresponding exemplary newsfeed will be provided in connection to FIG. 4. In addition, detailed description of a corresponding story framework will be provided in connection with FIGS. 5A-5B. Finally, detailed descriptions of an exemplary privacy settings interface will be provided in connection with FIGS. 6-7.

FIG. 1 is a flow diagram of an exemplary computer-implemented method 100 for creating and maintaining digital privacy control. The steps shown in FIG. 1 may be performed by any suitable computer-executable code and/or computing system, such as the systems described herein. In one embodiment, the steps shown in FIG. 1 may be performed by modules operating within a computing device. For example, the steps shown in FIG. 1 may be performed by modules operating in a server 202 and/or modules operating in a user device 204 (e.g., as shown in exemplary system 200 in FIG. 2).

Server 202 generally represents any type or form of backend computing device that performs one or more social networking functions as part of a social networking platform that manages server 202. Although illustrated as a single entity in FIG. 2, server 202 may include and/or represent a group of multiple servers that operate in conjunction with one another. User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc.

Figure 2:
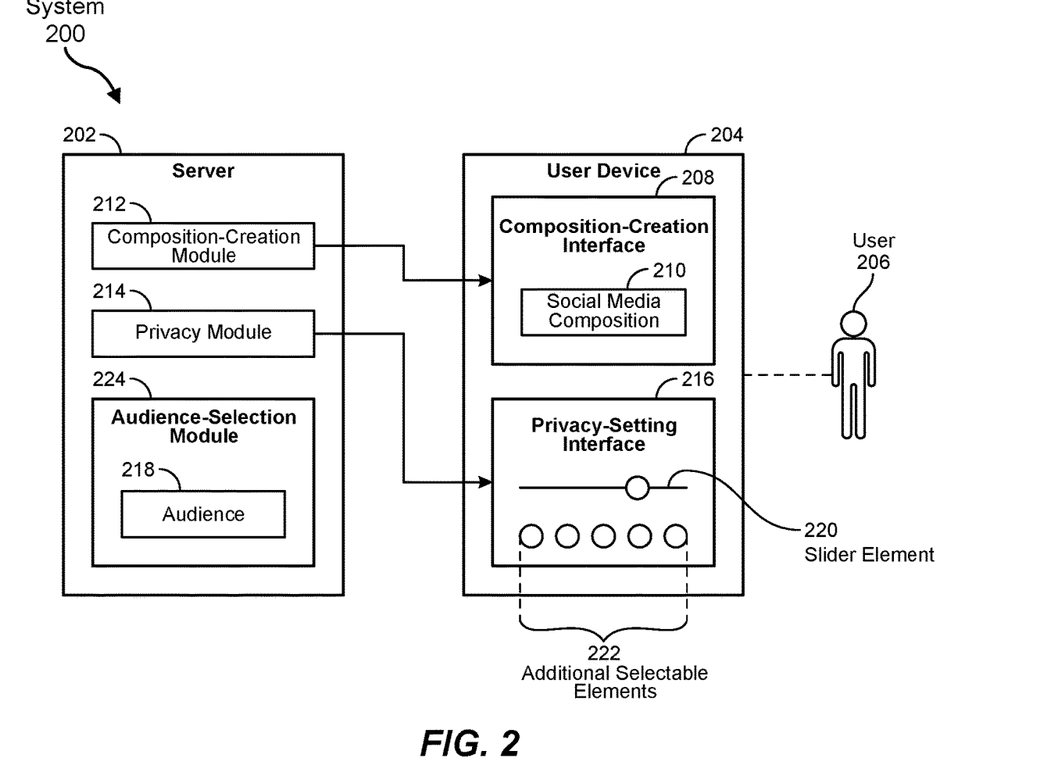
FIG. 2 is a block diagram of an exemplary system for creating and maintaining digital elements for audience selection.

In some examples, a user 206 of user device 204 may be a member of the social networking platform that manages server 202. In these examples, user device 204 may have installed an instance of a social networking application that operates as part of the social networking platform. Additionally or alternatively, user device 204 may have installed a browser that may navigate to one or more webpages maintained by the social networking platform. The social networking application and/or browser may provide a composition-creation interface 208, which may be presented via a display element of user device 204 and which may display content received from server 202.

Figure 3:
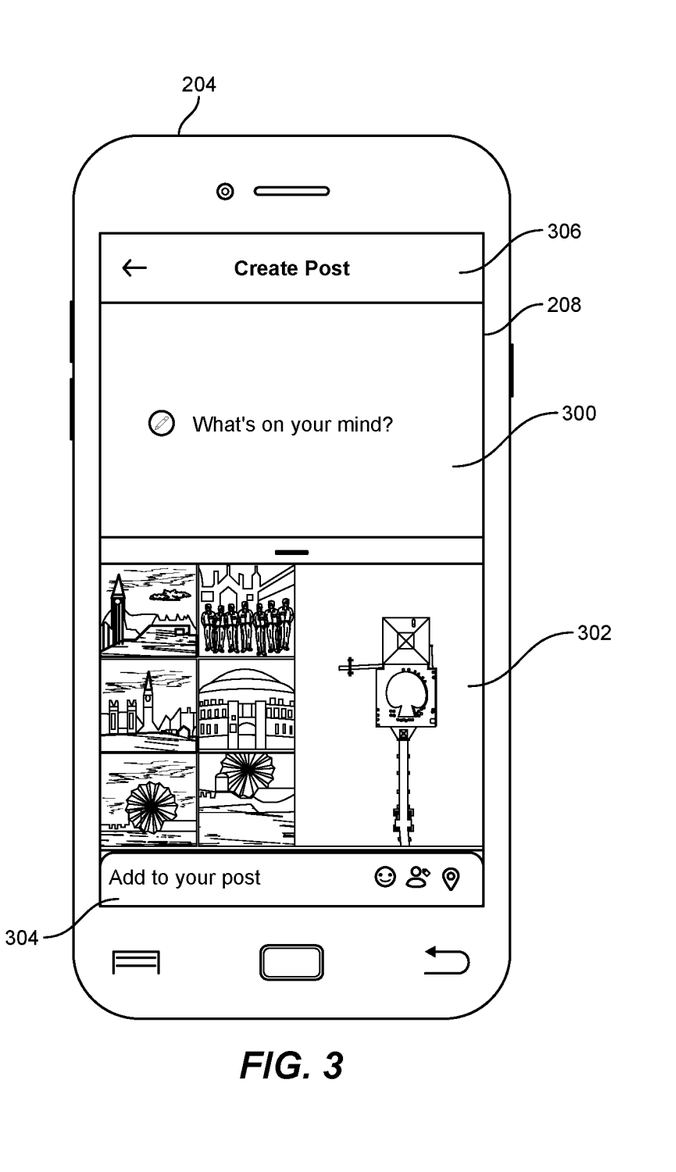
FIG. 3 is an illustration of an exemplary post being created in a composition interface.

Composition-creation interface 208 generally represents any type or form of interface that allows users of a social networking platform to compose social media compositions such as a social media composition 210. The term "social media composition" may refer to any type or form of digital composition created by a user of the social networking platform to be posted to the social networking platform (e.g., to be viewed by one or more additional users). A social media composition may include a variety of content including, without limitation, a digital photograph, a digital video, a gif, text, a link, etc. FIG. 3 provides an exemplary illustration of composition-creation interface 208 in one embodiment.

Figure 4:
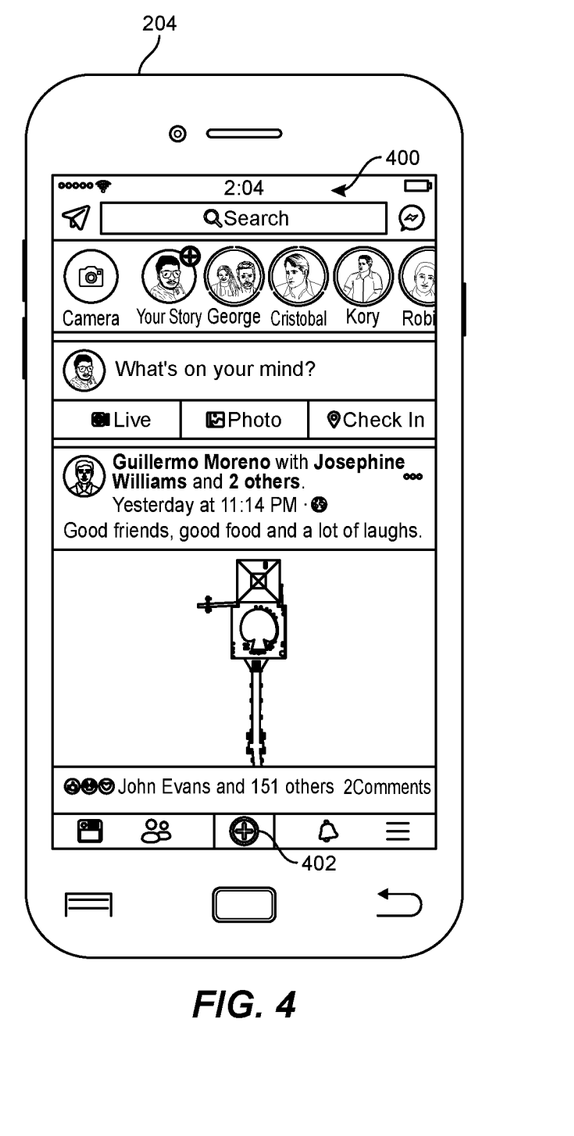
FIG. 4 is an illustration of an exemplary newsfeed being displayed in a consumption interface.

Social media composition 210 may be posted within a variety of different frameworks provided by the social networking platform. For example, social media composition 210 may be posted as a newsfeed post to a newsfeed within a newsfeed framework. The term "newsfeed" as used herein generally refers to a social media consumption interface that presents a scrollable collection of social media compositions created by a particular user's contacts. FIG. 4 provides an exemplary illustration of a newsfeed interface 400.

As another example, social media composition 210 may be posted as a story to a story-consumption interface within a stories framework. The term "story" may refer to an ephemeral series of posts created by a particular source within a designated time period, which vanish (e.g., are no longer accessible to an audience) after a designated length of time has passed. For example, a digital story may include posts created within the last twenty-four hours and may be intended to visually tell the story of the source's day. In this example, the digital story may be thought of as a single presentation (e.g., video and/or slideshow), which is continuously evolving as the source adds posts to the digital story.

In some examples, the social networking platform may automatically create a primary story for each user and/or entity who has an account with the social networking platform. In this embodiment, a primary story may be named after its corresponding user and/or entity. For example, if a user is named "Sasha Costello," her primary story may be given the name "Sasha Costello" by default. As another example, if an entity named "Table Company" has a business account with the social networking platform, the entity's primary story may be given the name "Table Company" by default. In addition to creating primary stories, the social networking platform may allow its users to create additional stories. In these embodiments, a user may configure an additional story as a solo-story, to which only the user (or an entity associated with the user) may contribute content, or a shared story, to which a selected set of users and/or entities may contribute content. The name of an additional story may be selected by the user creating the additional story. In some examples, the user may select a name that reflects a theme he or she wishes to associate with the additional story (e.g., "Our Family," "Senior Field Trip," "My Daily Advice," "Breaking News," etc.).

In examples in which social media composition 210 may be posted as a story within a stories framework, social media composition 210 may be displayed via a story-consumption interface to a viewer (e.g., a contact of user 206) as part of a digital storybook that includes stories of users and/or entities who are associated with the viewer (e.g., users and/or entities that are contacts of the viewer and/or whose stories the viewer has elected to digitally receive). In examples in which a digital story includes posts from a source created within twenty-four hours of the current time, this digital storybook may represent a digital storybook of the last twenty-four hours.

Figure 5A:
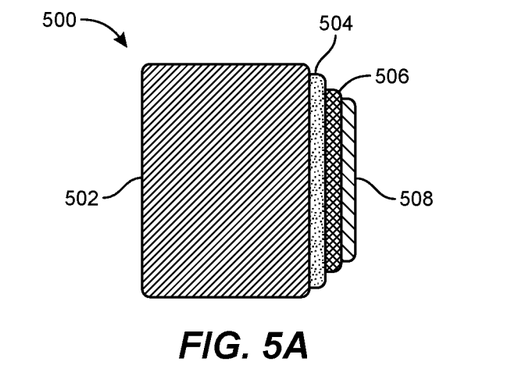
FIGS. 5A-5C are a series of block diagrams that conceptually illustrate a storybook framework.
Figure 5B:
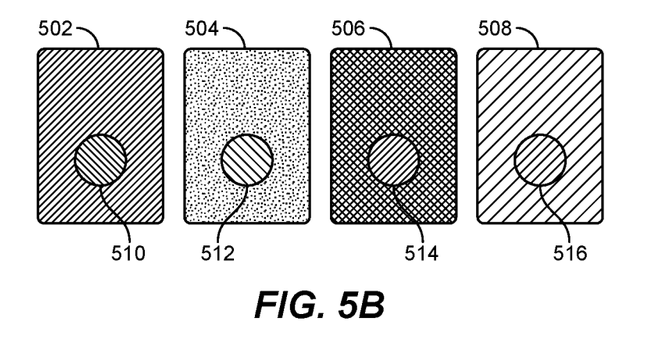
Figure 5C:
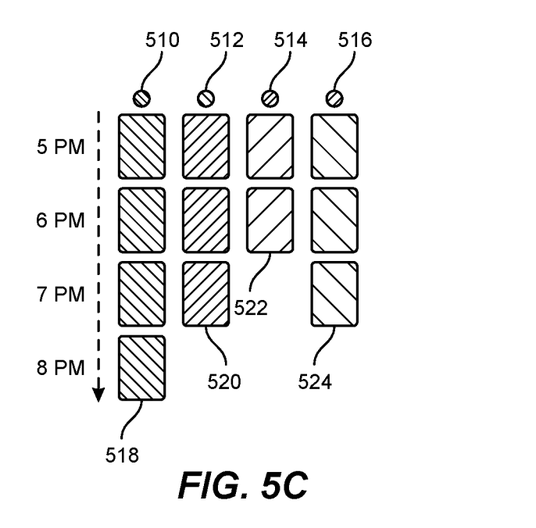

FIGS. 5A-5C provide a conceptual depiction of a digital storybook 500, depicted in FIG. 5A, assembled by a social networking platform for a viewer of social media composition 210. Digital storybook 500 may include a series of different digital stories selected for a viewer of social media composition 210 (e.g., a first digital story 502, story a second digital story 504, a third digital story 506, and a fourth digital story 508). Each digital story within digital storybook 500 may correspond to a different source and may include a series of posts generated and/or added by its corresponding source. As a specific example, first digital story 502 may correspond to a first source 510 (as illustrated in FIG. 5B) and may include a series of four posts (posts 518 in FIG. 5C) generated by first source 510. Then, second digital story 504 may correspond to a second source 512 (as illustrated in FIG. 5B) and may include a series of three posts (posts 520 in FIG. 5C) generated by second source 512. Then, third digital story 506 may correspond to a third source 514 (as illustrated in FIG. 5B) and may include a series of two posts (posts 522 in FIG. 5C) generated by third source 514. Finally, fourth digital story 508 may correspond to a fourth source 516 (as illustrated in FIG. 5B) and may include a series of three posts generated by fourth source 516 (posts 524 in FIG. 5C).

In examples in which a digital story represents a collection of posts generated by a particular source within a designated time frame (e.g., twenty-four hours), the posts of each digital story may be organized by time (e.g., with earlier posts being displayed before later posts), as illustrated in FIG. 5C. In some such examples, the posts may be organized based on each post's creation time. In additional or alternative examples, the posts may be organized according to a timestamp associated with content included in a post. For example, posts that include images may be organized based on a capture time of an image.

In one embodiment, a story-consumption interface may be configured to show each post within a given digital story prior to showing posts of a subsequent digital story (e.g., unless the story-consumption interface receives user input that skips one or more posts within a digital story). To summarize the components of the exemplary story framework described above, a digital storybook may refer to a collection of digital stories selected for a particular user (e.g., user 206), a digital story may refer to a collection of posts generated by a particular source (e.g., author), and a post may refer to any type or form of story composition added to a digital story.

Returning to FIG. 1, at step 110, one or more of the systems described herein may provide a composition-creation interface that enables a user to create a social media composition. For example, as illustrated in FIG. 2, a composition-creation module 212 may provide composition-creation interface 208, which may allow user 206 to create social media composition 210.

Composition-creation module 212 may present composition-creation interface 208 to user 206 in response to a variety of triggers. For example, composition-creation module 212 may present composition-creation interface 208 as a landing screen in response to receiving user input launching the social media application. In other examples, composition-creation module 212 may present composition-creation interface 208 in response to receiving user input (i.e., a tap to a touchscreen) selecting a composition icon. Using FIG. 4 as a specific example, composition-creation module 212 may present composition-creation interface 208 in response to receiving user input selecting icon 402 within the newsfeed interface 400. In one embodiment, composition-creation module 212 may present composition-creation interface 208 in response to a determination that a designated amount of time has passed since user 206 has added a new post to the social media application.

Composition-creation interface 208 may have a variety of appearances and may include a variety of different elements. FIG. 3 provides an exemplary illustration of composition-creation interface 208 in one embodiment. In this exemplary embodiment, composition-creation interface 208 may include multiple spaces, each of which corresponds to a different functionality: a text space 300, which enables a user to input text, a media space 302, which displays one or more media items that may be selected by the user, a metadata space 304, which displays one or more metadata items that may be selected by the user, and a posting space 306, which the user may select when he or she is ready to post a social media composition created using composition-creation interface 208.

Returning to FIG. 1, at step 120, one or more of the systems described herein may additionally provide a privacy-settings interface that enables the user to select an audience for the social media composition. For example, as illustrated in FIG. 2, a privacy module 214 may provide a privacy-settings interface 216 that allows user 206 to select an audience 218 for social media composition 210.

Privacy-settings interface 216 may represent any type or form of user interface that enables a user (e.g., user 206) to configure an audience for a social-media composition to be applied once the composition has posted. The term "audience" may generally refer to the users of the social media platform (e.g., contacts of user 206) with permission to access a posted social media composition. Such access may include permission to view, permission to comment (e.g., add text or media to a comments section of a post), permission to add to (e.g., permission to add a related social media composition), and/or permission to share (e.g., permission to re-post to one's newsfeed). In some examples, privacy-settings interface 216 may provide all-or-nothing access to audience members (i.e., each member added to audience 218 will be given the same bundle of access rights). In these examples, the access rights included in the bundle may be designated by default or may be user configurable. In other examples, access may be gradated, where different sub-groups of audience 218 have different access rights.

In some examples, privacy-settings interface 216 may include one or more default privacy settings that select a default audience. In these examples, the default settings may serve as a starting point, which a user may alter via user input.

Privacy module 214 may provide privacy-settings interface 216 in a variety of different contexts. For example, privacy module 214 may present privacy-settings interface 216 as the final interface within a creation flow before social media composition 210 is published. In this example, privacy module 214 may present privacy-settings interface 216 after composition-creation module 212 presents composition-creation interface 208. Using FIG. 3 as a specific example, privacy module 214 may present privacy-settings interface 216 after composition-creation module 212 receives user input selecting a selectable element within posting space 308. In an alternative example, privacy module 214 may present privacy-settings interface 216 as an initial interface within a consumption flow, prior to composition-creation module 212 presenting composition-creation interface 208.

In another example, privacy module 214 may present privacy-settings interface 216 in response to receiving user input selecting a selectable privacy element (e.g., a selectable graphic of a lock or a group of users) included within another interface and/or a hover screen presented within a creation flow. In one such example, the selectable privacy element may be accessible at multiple points in the creation flow (e.g., from multiple interfaces within the creation flow). For example, the selectable privacy element may occupy a same position within each interface of the creation flow.

In some embodiments, privacy module 214 may present privacy-settings interface 216 as part of a post-maintenance flow, which enables user 206 to change the membership of audience 218 after social media composition 210 has posted. In these embodiments, privacy module 214 may present privacy-settings interface 216 in response to receiving user input to a review interface, such as a data-management interface and/or a producer-view of posted social media composition 210. In one such embodiment, the review interface may include a selectable privacy element and privacy module 214 may present privacy-settings interface 216 in response to receiving user input selecting the selectable privacy element.

Returning to FIG. 1, at step 130, one or more of the systems described herein may display, within the privacy-settings interface, a slider element that may be used to select a size of the audience, where sliding the slider element in a first direction decreases a size of the audience and sliding the slider element in a second direction increases the size of the audience. For example, as illustrated in FIG. 2, privacy module 214 may display, within privacy-settings interface 216, a slider element 220 that may be used to select a size of an audience 218, where sliding slider element 220 in a first direction may decrease the size of audience 218 and sliding slider element 220 in a second direction may increase the size of audience 218.

Slider element 220 may generally represent any type or form of graphical element configured to slide (e.g., unidirectionally, bidirectionally, or poly-directionally) within privacy-settings interface 216. In some examples, slider element 220 may slide along one or more linear axes (e.g., horizontally, vertically, and/or diagonally). In other examples, slider element 220 may slide non-linearly (e.g., circularly or along an undulating line).

Figure 6:
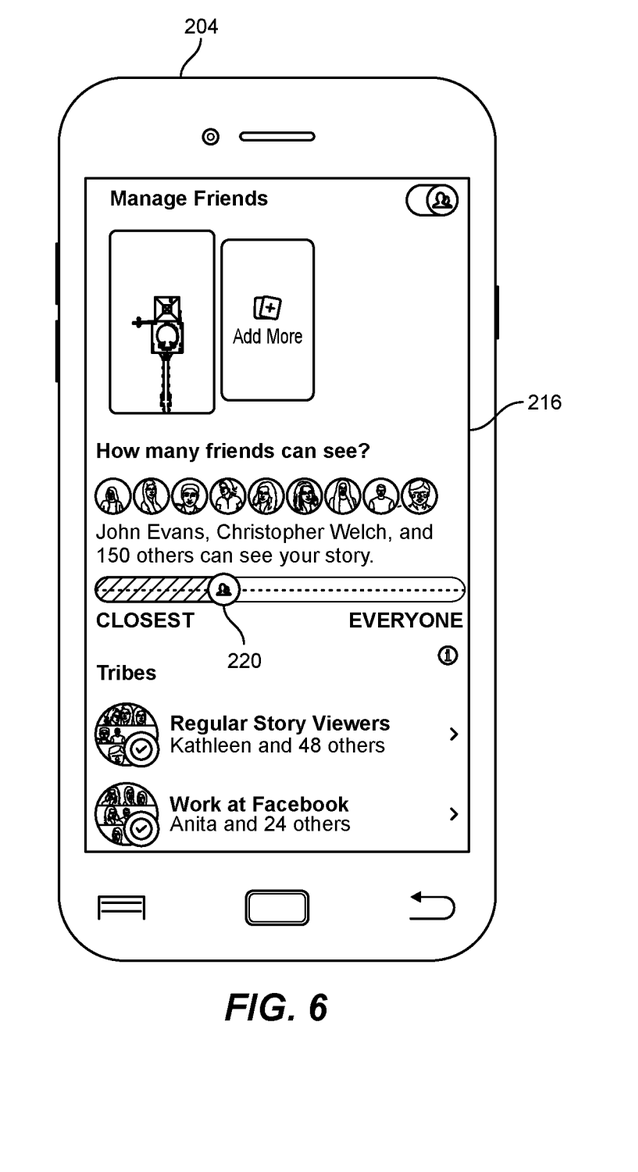
FIGS. 6-7 are an illustration of an exemplary audience selection interface within a social media composition flow.
Figure 7:
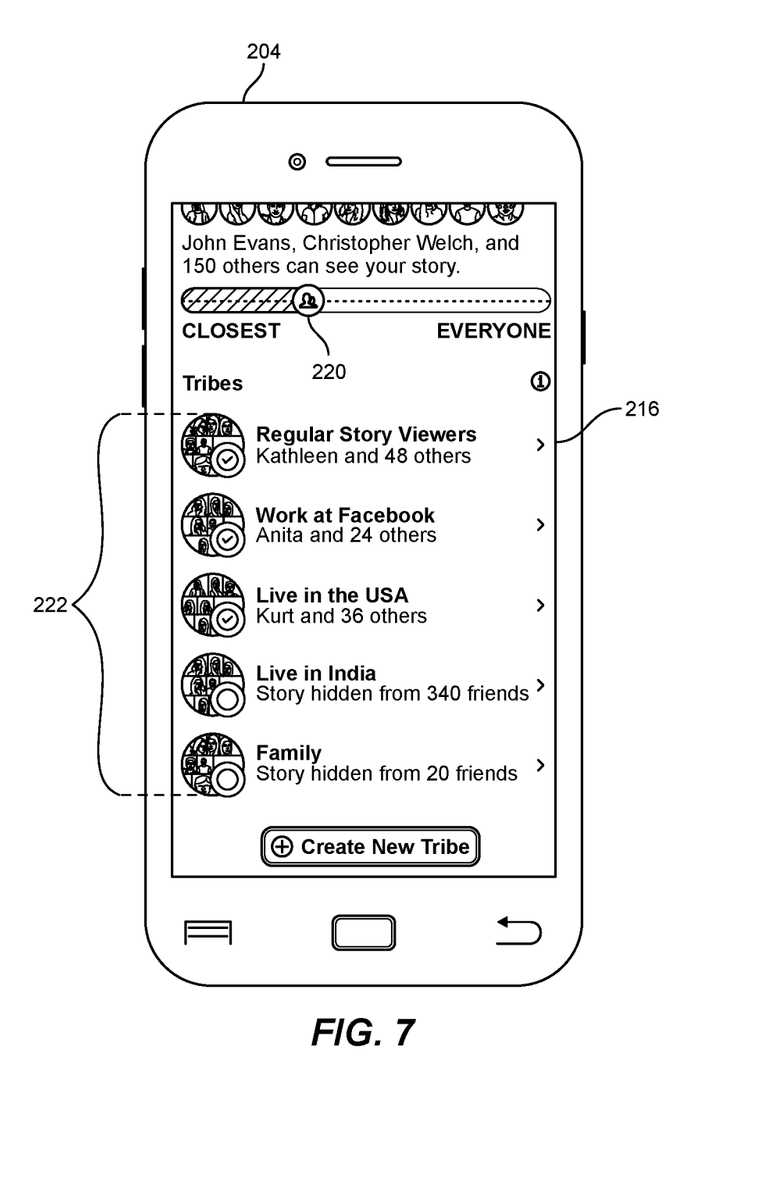

Slider element 220 may take a variety of forms (e.g., a circular form, a dial form, a rectangular form, a lock form, etc.). In some examples, a position of slider element 220 may be marked within privacy-settings interface 216. For example, an axis along which slider element 220 slides may include, along its length, a set of multiple hashmarks. FIGS. 6-7 provide an exemplary illustration of privacy-settings interface 216 in which slider element 220 takes the form of a circular element with a graphic of two audience members in its center. Slider element 220 as depicted in FIG. 6 is configured to slide along a horizontal linear axis, marked with a series of dots, within an elongate cylindrical tube.

As mentioned above, privacy-settings interface 216 may be configured to change a size of audience 218 based on a position of slider element 220. Using FIGS. 6-7 again as a specific example, privacy-settings interface 216 may decrease a size of audience 218 in response to receiving input that slides slider element 220 to the left, such that the farther left the position of slider element 220, the smaller the size of audience 218. Contrarily, privacy-settings interface 216 may increase the size of audience 218 in response to receiving input that slides slider element 220 to the right, such that the farther right the position of slider element 220, the larger the size of audience 218. In this example, when slider element 220 is slid in its farthest left position, the size of audience 218 may include only user 206. And, when slider element 220 is slid in its farthest right position, the size of audience 218 may include all of user 206's contacts.

In some examples, as illustrated in FIGS. 6-7, there may be text labeling each direction (e.g., "closest" vs. "everyone.") Additionally, privacy-settings interface 216 may include text indicating a number of users within audience 218 given a current position of slider element 220. In some examples, slider element 220 and one or more associated components (e.g., a graphic delineation of an axis, such as the tubular structure in FIGS. 6-7 and/or text describing the size of audience 218), may form part of an audience-selection assembly.

Slider element 220 may slide in response to a variety of different triggers. For example, in one embodiment, slider element 220 may slide to a predetermined default position, dictated by a default configuration, in response to input launching the display of privacy-settings interface 216. The default position may be set in a variety of ways. For example, in some examples, a user (e.g., user 206) may set the default position via user input. Alternatively, the social media platform may set the default position. The social media platform may base the default position on a variety of factors. In one example, the social media platform may set the default position based on a standard platform setting that sets the position at a fixed position (e.g., a position corresponding to an audience size of a fixed number of audience members). In other examples, the social media platform may customize the default position to user 206 (e.g., based on user history such as an audience size selected by user 206 in the past, a classification of content identified within social media composition 210, etc.). In one embodiment, the social media platform may rely on machine learning to select the default position.

In some examples (e.g., after sliding to a predetermined default position in response to input launching the display of privacy-settings interface 216), slider element 220 may slide in response to receiving user sliding input (e.g., submitted via a touchscreen of user device 204 and/or an auxiliary device connected with user device 204). In one example, the user sliding input may select and slide slider element 220. In an additional or alternative example, slider element 220 may operate within an audience-selection assembly and the user sliding input may select an additional selectable element within the audience-selection assembly. For example, the user sliding input may select a graphical hash along an axis, such as the axis depicted in FIG. 6.

In some examples, a position of slider element 220 may be at least partially dictated by user input to additional elements within privacy-settings interface 216 (i.e., outside of an audience-selection assembly that includes slider element 220). For example, a position of slider element 220 may be influenced by input to a group-selection portion of privacy-settings interface 216, as will be discussed in greater detail below.

In some examples, privacy-settings interface 216 may provide one or more additional processes for selecting audience 218 (i.e., in addition to the process described in connection with slider element 220). For example, in some embodiments, privacy-settings interface 216 may enable user 206 to further configure audience 218 by selecting groups (e.g., "tribes") of his or her contacts. A "group" may generally represent a set of one or more user contacts with one or more shared attributes. For example, privacy-settings interface 216 may include a group of contacts with a shared place of employment, a group of contacts who attend the same school, and/or a group of contacts who speak a common language.

In some examples, groups may be platform-generated based on information available to the platform (e.g., based on information collected from user profiles). In additional or alternative examples, groups may be user-generated, allowing users to create and organize contacts in a way that is personally meaningful.

In examples in which privacy-settings interface 216 enables a user to configure audience 218 by selecting groups, privacy-settings interface 216 may include a set of additional selectable elements 222. Each element within additional selectable elements 222 may correspond to a different group and privacy module 214 may configure audience 218 based on which selectable elements are selected via user input. FIGS. 6-7 illustrate a specific embodiment of privacy-settings interface 216 in which additional selectable elements 222 include elements corresponding to (1) a regular story viewers group, (2) a work at Facebook group, (3) a live in the USA group, (4) a live in India group, and (5) a family group. As shown in FIG. 7, privacy-settings interface 216 may also include a selectable element allowing user 206 to create additional groups.

In some examples, privacy module 214 may configure audience 218 to only include contacts that belong to a group corresponding to the one or more elements selected via user input. Returning to FIGS. 6-7 as a specific example, privacy module 214 may receive user input selecting the element corresponding to the "live in India" group and the element corresponding to the "regular story viewers" group. In this specific example, privacy module 214 may configure audience 218 to only include contacts of user 206 who (1) live in India and (2) are regular story viewers of user 206's story. In other examples, privacy module 214 may configure audience 218 to include contacts that belong to groups corresponding to the one or more elements selected via user input but may not limit audience 218 to contacts within such groups (i.e., may include other contacts in addition).

In one embodiment, privacy module 214 may slide slider element 220 in response to input received by additional selectable elements 222. For example, privacy module 214 may (1) identify groups selected via additional selectable elements 222, (2) identify a number of contacts in each selected group, (3) set the size of audience 218 to the identified number, and (4) slide slider element 220 to a position corresponding to the set size. In one such embodiment, the set size may be modifiable (e.g., by user input to slider element 220 following the selection of additional selectable elements 222).

Finally, at step 140, one or more of the systems described herein may configure the size of the audience based on a position of the slider element. For example, as illustrated in FIG. 2, an audience-selection module 224 may configure the size of audience 218 based on a position of slider element 220.

Audience-selection module 224 may configure audience 218 based on a variety of considerations. For example, audience-selection module 224 may configure audience 218 (1) based on a quantitative consideration (e.g., a size indicated by slider element 220), and (2) based on a qualitative consideration (e.g., a group selection via additional selectable elements 222). Each of these will be discussed, in turn.

First, audience-selection module 224 may configure audience 218 based on a quantitative consideration. For example, audience-selection module 224 may (1) identify the position of slider element 220 and (2) configure audience 218 to match a size indicated by the identified position of slider element 220. Turning to FIG. 6 as a specific example, audience-selection module 224 may determine that a position of slider element 220 corresponds to a size of one hundred and fifty-two audience members. In response, audience-selection module 224 may configure audience 218 to include one hundred and fifty-two audience members.

Next, audience-selection module 224 may configure audience 218 based on a qualitative consideration. That is, audience-selection module 224 may determine which users to include in the number of allotted audience members. Audience-selection module 224 may select which users to include based on a variety of factors. In one embodiment, audience-selection module 224 may select specific audience members based on user input. For example, as discussed above in connection with step 130, privacy-settings interface 216 may include additional selectable elements 222 that enable user 206 to select groups of users to include in audience 218. In this example, audience-selection module 224 may (1) determine which selectable elements from among additional selectable elements 222 were selected by user 206 and (2) configure audience 218 to include users in the groups corresponding to the selected selectable elements.

As a specific example, as mentioned in connection with step 130, in a specific example based in FIG. 6, user 206 may have selected (1) a selectable element corresponding to a "live in India" group and (2) a selectable element corresponding to a "regular story viewers" group. In this specific example, audience-selection module 224 may (1) determine that user input selected the "live in India" group and the "regular story viewers" group and (2) configure audience 218 to include users included within the "live in India" group and the "regular story viewers" group.

In addition or as an alternative to selecting members of audience 218 based on user input, audience-selection module 224 may select audience members based on data collected by the social media platform. For example, audience-selection module 224 may select audience members based on user history (e.g., contacts whom user 206 has added to audience 218 in the past, contacts who are predicted to be interested in social media composition 210 based on a past interaction with user 206's social media compositions, etc.). As a related example audience-selection module 224 may select members based on content identified within social media composition 210 (e.g., based on a prediction that certain contacts would be interested in the content). As a specific example, audience-selection module 224 may determine that social media composition 210 is written in a particular language and may select, as members of audience 218, contacts of user 206 who have indicated that they speak the particular language in their online profiles with the social media platform.

In certain embodiments, audience-selection module 224 may set a size for audience 218 based on a qualitative consideration. For example, in examples in which privacy-settings interface 216 includes additional selectable elements 222 corresponding to various groups, audience-selection module 224 may (1) determine which selectable elements from among additional selectable elements 222 were selected by user 206 and (2) configure audience 218 to only include contacts within a group corresponding to a selected selectable element. In these examples, audience-selection module 224 may limit the size of audience 218 to the number of contacts in a selected group, such that only contacts from selected groups are included in audience 218.

After audience-selection module 224 configures a size and qualitative membership of audience 218, a posting module may post social media composition 210 to members of audience 218 via user 206's newsfeed such that user 206 and the members of audience 218 (i.e., and only user 206 and those audience members) may be able to view the post.

As described throughout the instant disclosure, the present disclosure provides systems and methods for creating and maintaining digital privacy controls. In one example, a computer-implemented method may include (1) providing a composition-creation interface that enables a user to create a social media composition, (2) additionally providing a privacy-settings interface that enables the user to select an audience for the social media composition, (3) displaying, within the privacy-settings interface, a slider element that may be used to select a size of the audience, where sliding the slider element in a first direction decreases a size of the audience and sliding the slider element in a second direction increases the size of the audience, and (4) configuring the size of the audience based on a position of the slider element.

In some examples, the method may further include receiving user input that slides the slider element into the position. In additional or alternative examples, the method may include additionally displaying, within the privacy-settings interface, a set of selectable elements, each of which corresponds to a different group of the user's contacts with a shared attribute. In one embodiment, the shared attribute may include an association with at least one of (1) a location, (2) a school, (3) a spoken language, or (4) a place of employment. In examples in which the method includes additionally displaying the set of selectable elements, the method may also include (1) receiving user input selecting one or more of the selectable elements and (2) configuring the audience to only include contacts who belong to a group whose corresponding selectable element was selected by the user input. In one embodiment, the method may further include sliding the slider element into the position in response to receiving the user input selecting one or more of the selectable elements and/or posting the social media composition to an audience of the configured size.

In one example, a corresponding system for implementing the above-described method may include (1) a composition-creation module, stored in memory, that provides a composition-creation interface that enables a user to create a social media composition, (2) a privacy module, stored in memory, that (i) provides a privacy-settings interface that enables the user to select an audience for the social media composition, and (ii) displays, within the privacy-settings interface, a slider element that may be used to select a size of the audience, where sliding the slider element in a first direction decreases a size of the audience and sliding the slider element in a second direction increases the size of the audience, (3) an audience-selection module, stored in memory, that configures the size of the audience based on a position of the slider element, and (4) at least one physical processor configured to execute the composition-creation module, the privacy module, and the audience-selection module.

In some examples, the above-described method may be encoded as computer-readable instructions on a non-transitory computer-readable medium. The computer-readable medium may include one or more computer-executable instructions that, when executed by a processor of a computing device, may cause the computing device to (1) provide a composition-creation interface that enables a user to create a social media composition, (2) additionally provide a privacy-settings interface that enables the user to select an audience for the social media composition, (3) display, within the privacy-settings interface, a slider element that may be used to select a size of the audience, where sliding the slider element in a first direction decreases a size of the audience and sliding the slider element in a second direction increases the size of the audience, and (4) configure the size of the audience based on a position of the slider element.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an", as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   providing a composition-creation interface that enables a user to create a social media composition;
   additionally providing a privacy-settings interface that enables the user to select an audience for the social media composition;
   displaying, within the privacy-settings interface, a slider element that may be used to select a size of the audience, where sliding the slider element in a first direction decreases a size of the audience and sliding the slider element in a second direction increases the size of the audience; and
   configuring the size of the audience based on a position of the slider element.

2. The computer-implemented method of claim 1, further comprising receiving user input that slides the slider element into the position.

3. The computer-implemented method of claim 1, further comprising additionally displaying, within the privacy-settings interface, a plurality of selectable elements, each of which corresponds to a different group of the user's contacts with a shared attribute.

4. The computer-implemented method of claim 3, wherein the shared attribute comprises an association with at least one of:
   a location;
   a school;
   a spoken language; or
   a place of employment.

5. The computer-implemented method of claim 3, further comprising:
   receiving user input selecting one or more of the selectable elements; and
   configuring the audience to only include contacts who belong to a group whose corresponding selectable element was selected by the user input.

6. The computer-implemented method of claim 5, further comprising sliding the slider element into the position in response to receiving the user input selecting one or more of the selectable elements.

7. The computer-implemented method of claim 1, further comprising posting the social media composition to the audience of the configured size.

8. A system comprising:
   a composition-creation module, stored in memory, that provides a composition-creation interface that enables a user to create a social media composition;
   a privacy module, stored in memory, that:
      provides a privacy-settings interface that enables the user to select an audience for the social media composition; and
      displays, within the privacy-settings interface, a slider element that may be used to select a size of the audience, where sliding the slider element in a first direction decreases a size of the audience and sliding the slider element in a second direction increases the size of the audience;
   an audience-selection module, stored in memory, that configures the size of the audience based on a position of the slider element; and
   at least one physical processor configured to execute the composition-creation module, the privacy module, and the audience-selection module.

9. The system of claim 8, wherein the privacy module additionally receives user input that slides the slider element into the position.

10. The system of claim 8, wherein the privacy module additionally displays, within the privacy-settings interface, a plurality of selectable elements, each of which corresponds to a different group of the user's contacts with a shared attribute.

11. The system of claim 10, wherein the shared attribute comprises an association with at least one of:
   a location;
   a school;
   a spoken language; or
   a place of employment.

12. The system of claim 10, wherein the privacy module further:
   receives user input selecting one or more of the selectable elements; and
   configures the audience to only include contacts who belong to a group whose corresponding selectable element was selected by the user input.

13. The system of claim 12, wherein the privacy module further slides the slider element into the position in response to receiving the user input selecting one or more of the selectable elements.

14. The system of claim 8, wherein a posting module posts the social media composition to the audience of the configured size.

15. A non-transitory computer-readable medium comprising one or more computer-readable instructions that, when executed by at least one processor of a computing device, cause the computing device to:
   provide a composition-creation interface that enables a user to create a social media composition;
   additionally provide a privacy-settings interface that enables the user to select an audience for the social media composition;
   display, within the privacy-settings interface, a slider element that may be used to select a size of the audience, where sliding the slider element in a first direction decreases a size of the audience and sliding the slider element in a second direction increases the size of the audience; and
   configure the size of the audience based on a position of the slider element.

16. The non-transitory computer-readable medium of claim 15, wherein the computer-readable instructions further cause the computing device to receive user input that slides the slider element into the position.

17. The non-transitory computer-readable medium of claim 15, wherein the computer-readable instructions further cause the computing device to additionally display, within the privacy-settings interface, a plurality of selectable elements, each of which corresponds to a different group of the user's contacts with a shared attribute.

18. The non-transitory computer-readable medium of claim 17, wherein the shared attribute comprises an association with at least one of:
   a location;
   a school;
   a spoken language; or
   a place of employment.

19. The non-transitory computer-readable medium of claim 17, wherein the computer-readable instructions further cause the computing device to:
   receive user input selecting one or more of the selectable elements; and
   configure the audience to only include contacts who belong to a group whose corresponding selectable element was selected by the user input.

20. The non-transitory computer-readable medium of claim 15, wherein the computer-readable instructions further cause the computing device to post the social media composition to an audience of the configured size.

* * * * *